July 24, 1923.
K. F. A. ROLLE
1,462,982
MACHINE FOR MAKING LINK MESH AND SIMILAR FABRIC
Filed Aug. 13, 1921
7 Sheets-Sheet 3
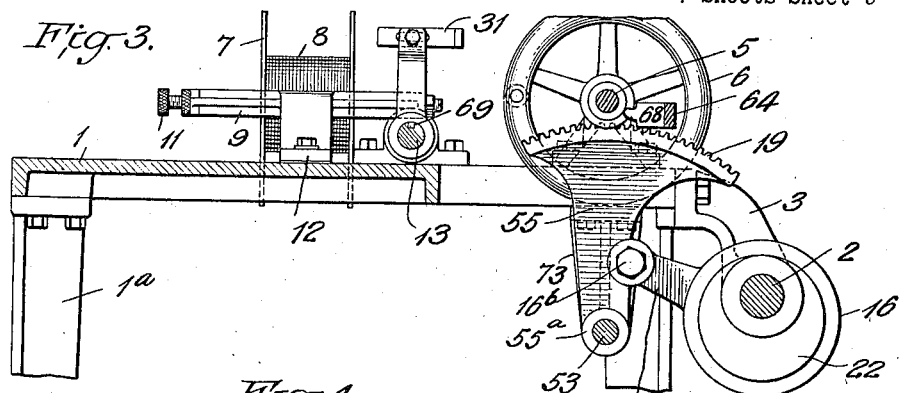
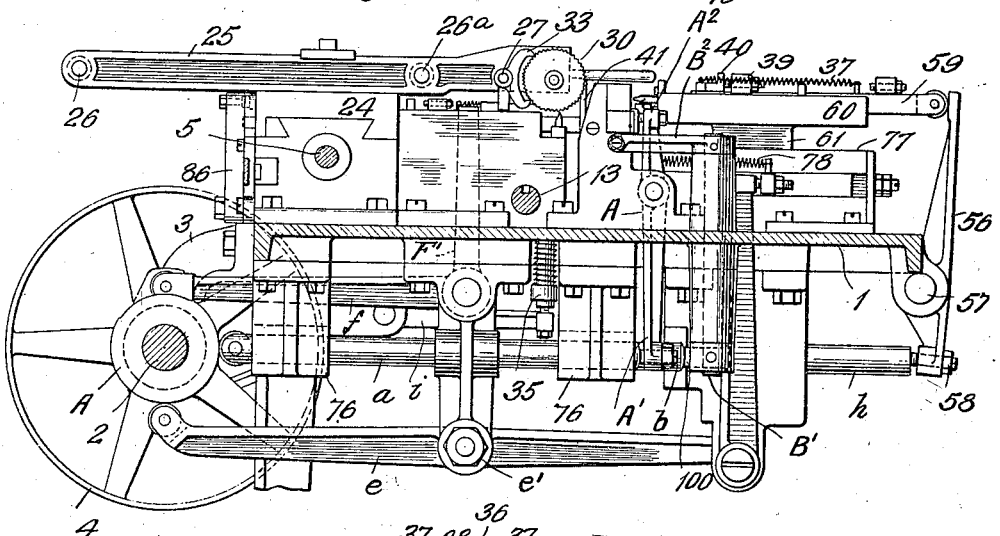
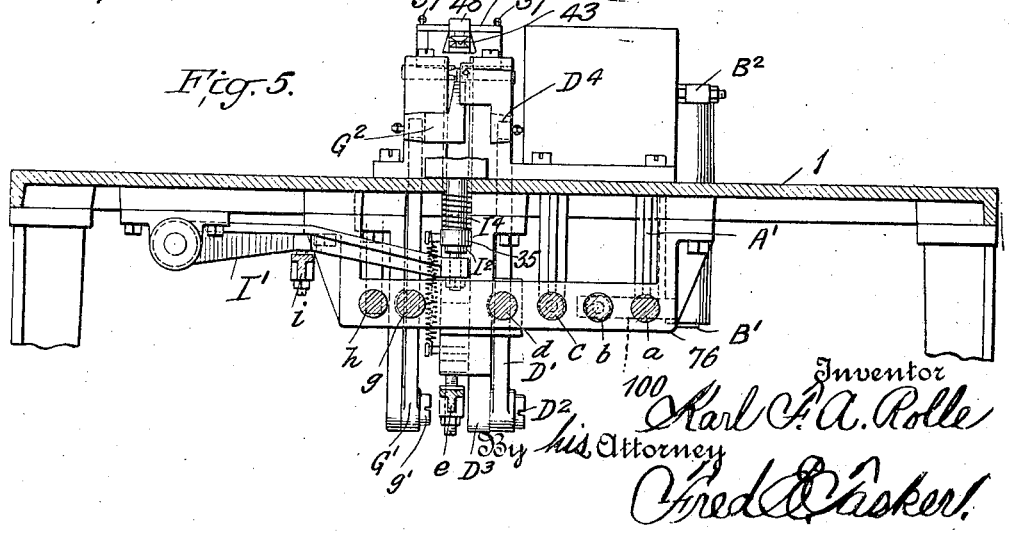

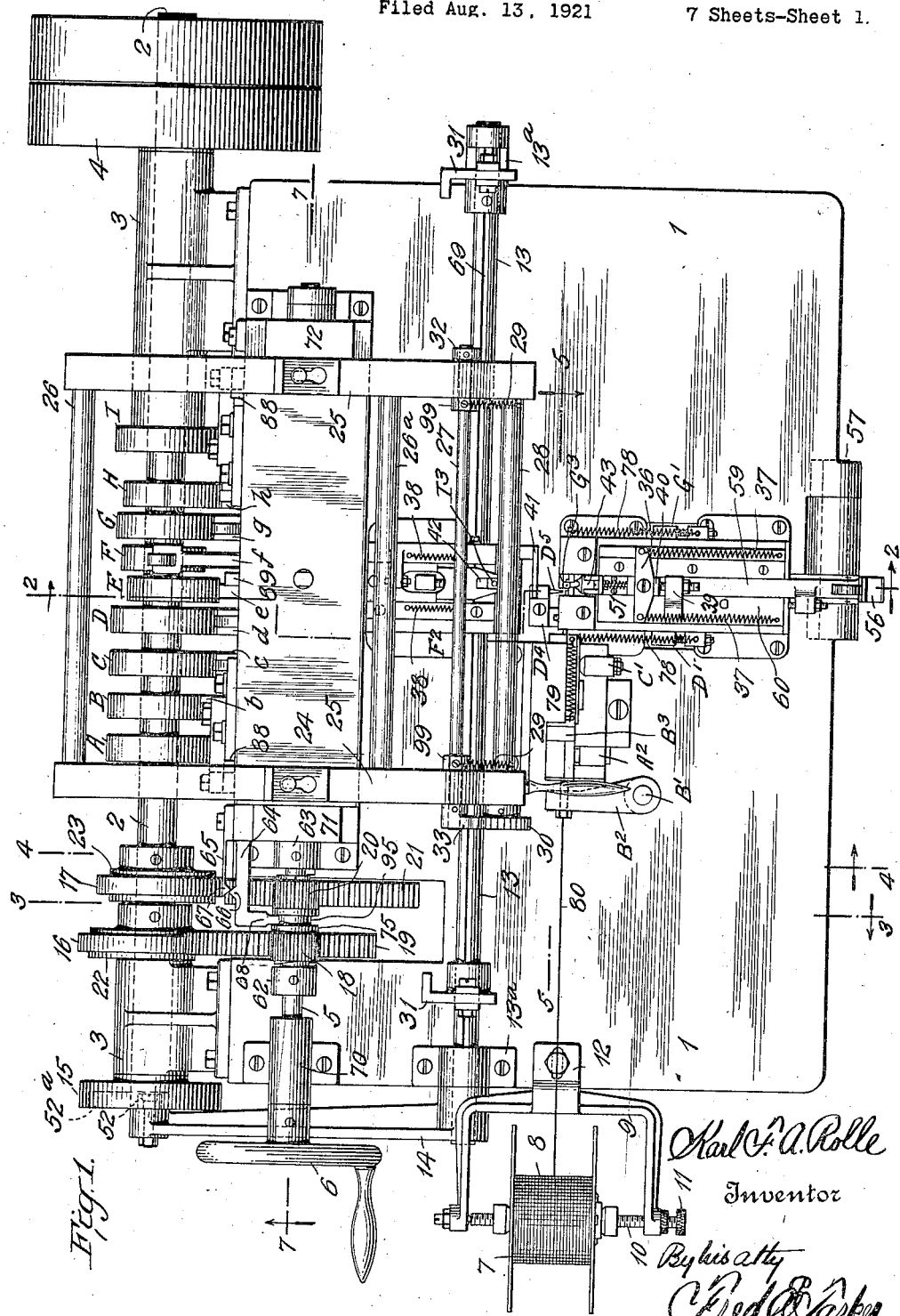

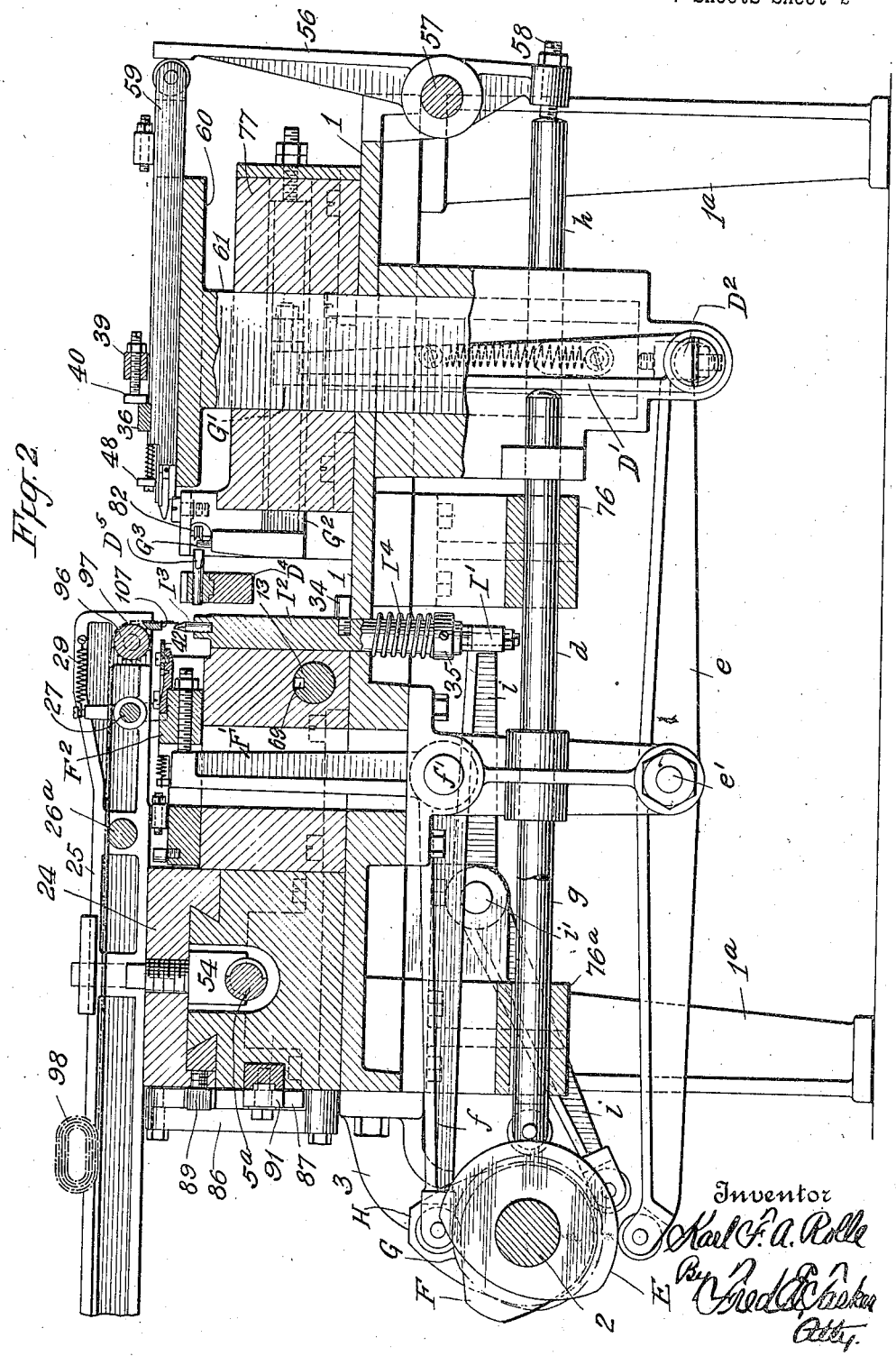

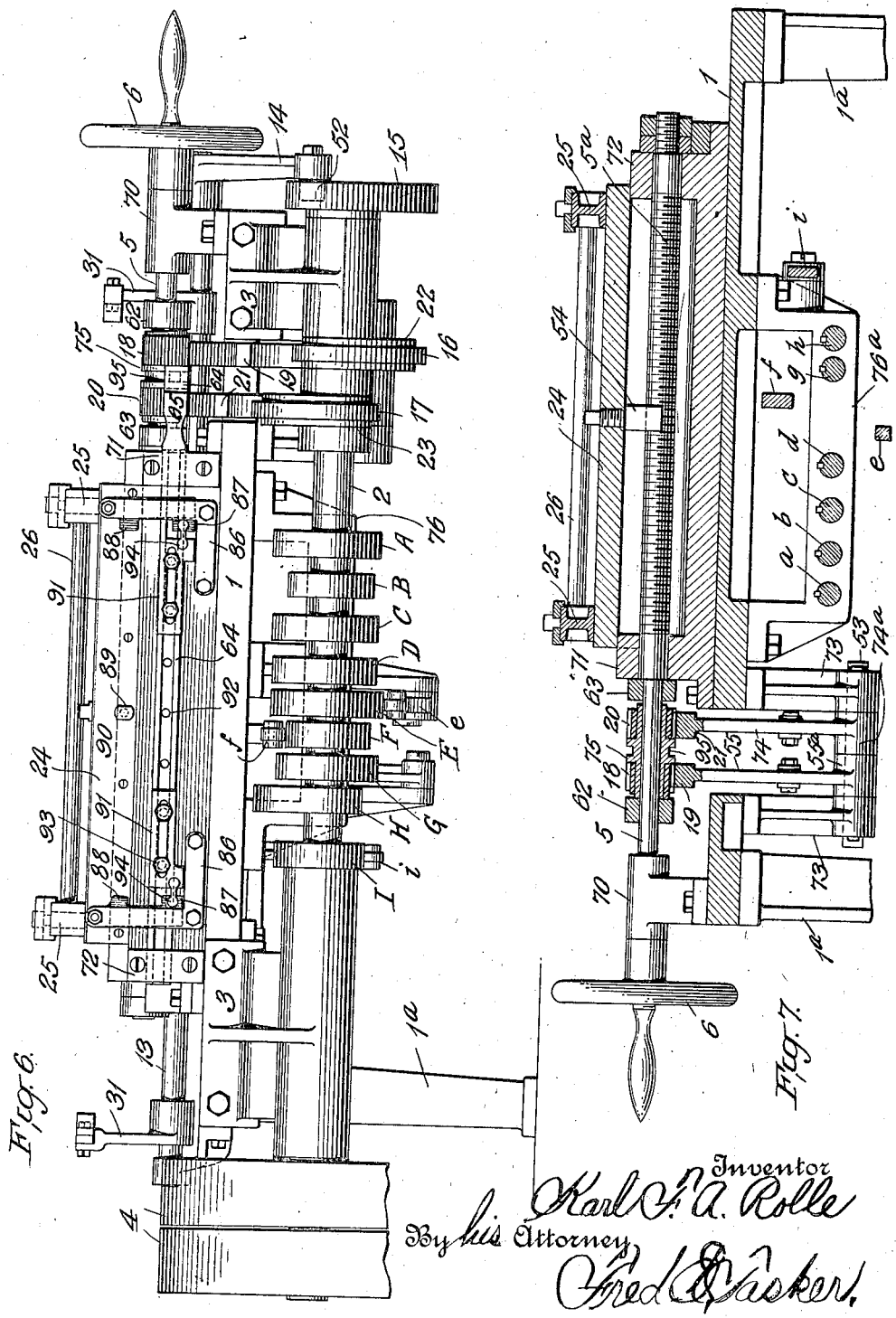

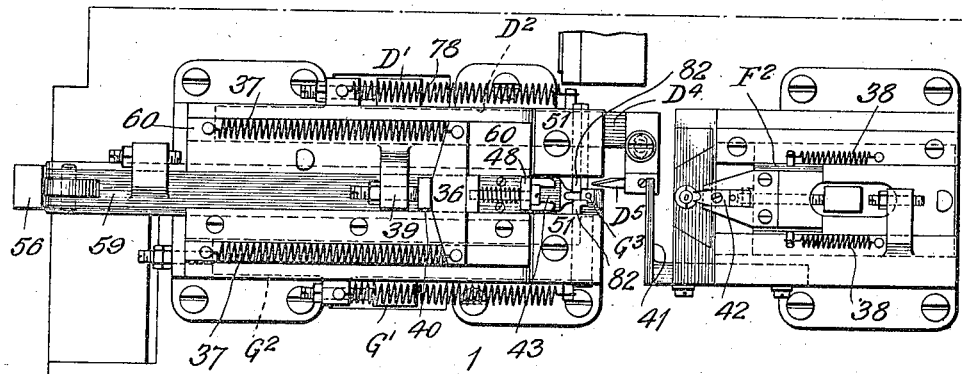

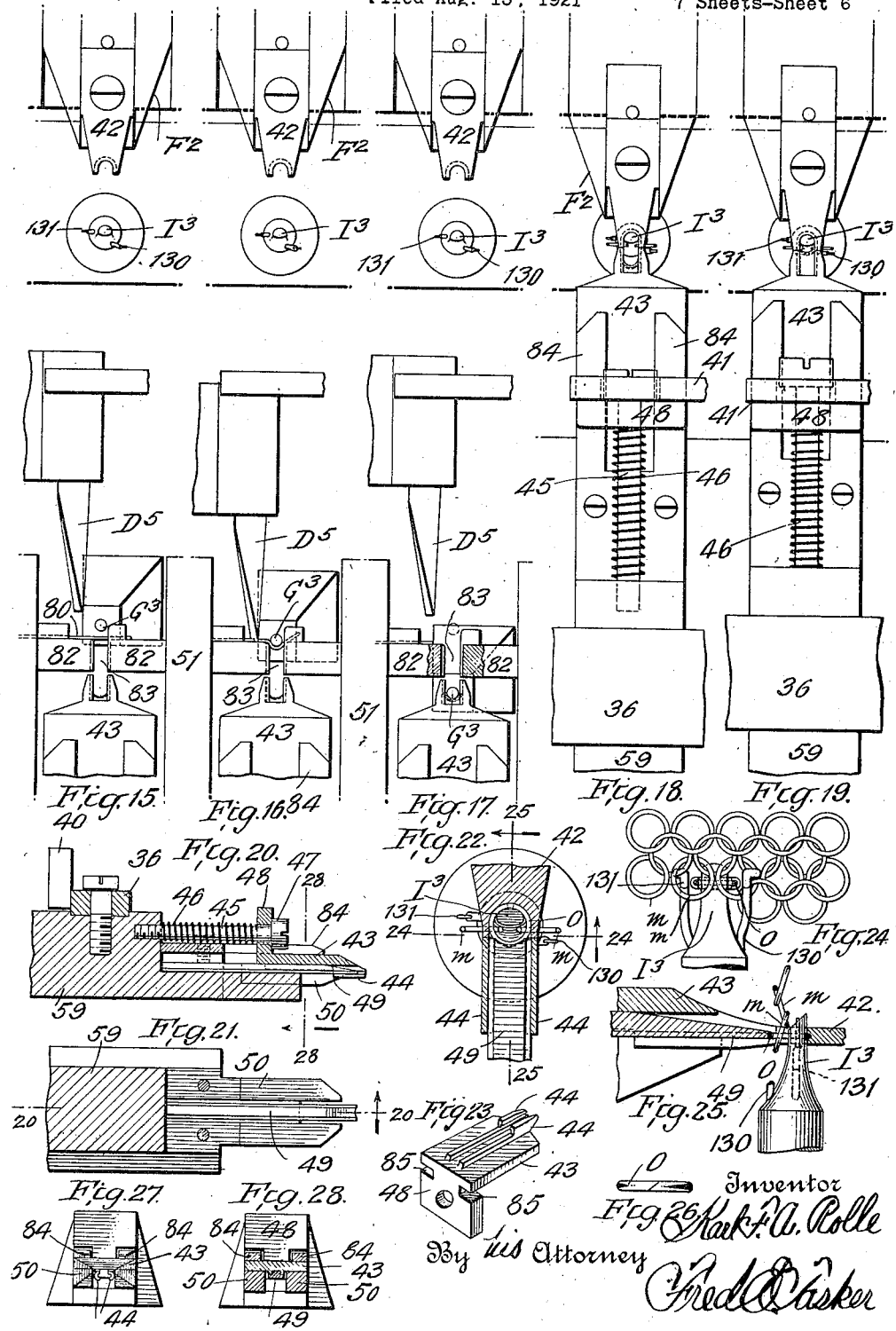

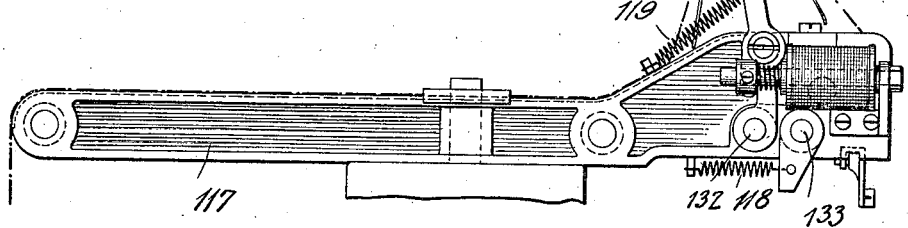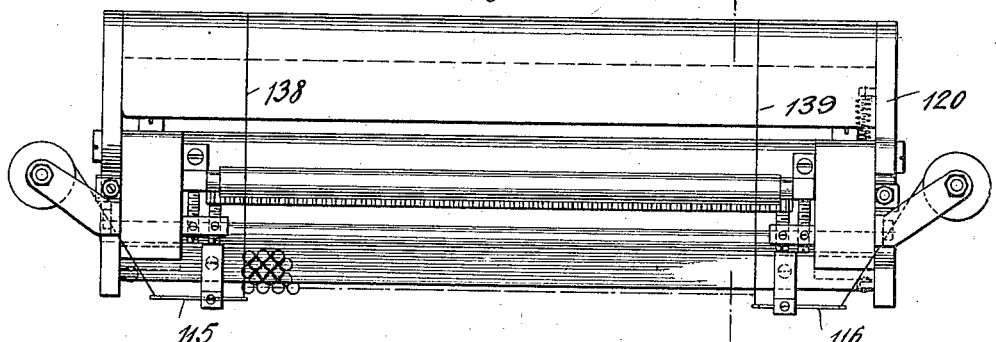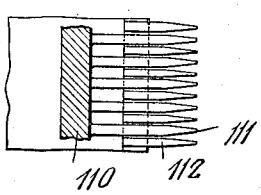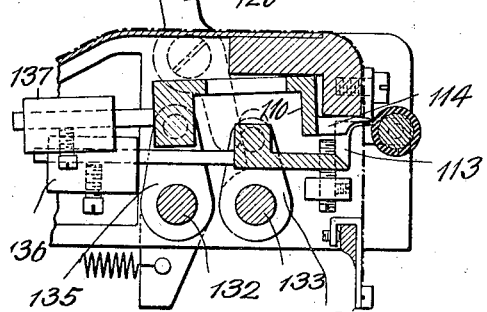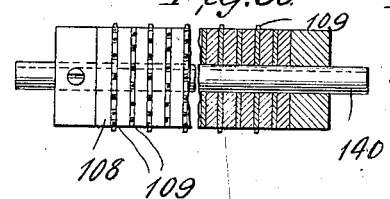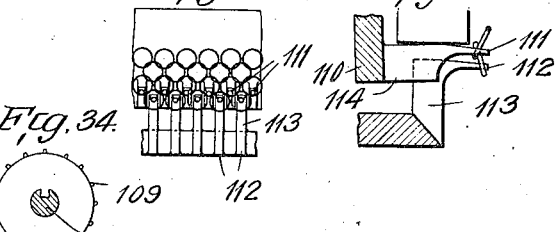

Patented July 24, 1923.

1,462,982

UNITED STATES PATENT OFFICE.

KARL F. A. ROLLE, OF VAUXHALL, NEW JERSEY, ASSIGNOR TO CARL A. BINDER, OF NEWARK, NEW JERSEY.

MACHINE FOR MAKING LINK MESH AND SIMILAR FABRIC.

Application filed August 13, 1921. Serial No. 492,025.

*To all whom it may concern:*

Be it known that I, KARL F. A. ROLLE, a citizen of Germany, and resident of Vauxhall, in the county of Union and State of New Jersey, have invented certain new and useful Improvements in Machines for Making Link Mesh and Similar Fabric, of which the following is a specification, reference being had therein to the accompanying drawing.

My invention refers to certain new and useful improvements in machines for the manufacture of wire or mesh fabric of the type usually known as "ring-mesh," and consisting of a multiplicity of rings or links each of which is caused by the action of the machine to be automatically engaged with a plurality of other links in the formation of a sheet or tube of variable dimensions, and to machines for making any similar chain link material.

One of the chief objects of the present invention among many which might be mentioned is to provide a simple and efficient machine of this character which will have but few wearing parts and which will enable the frabric to be economically made in suitable form, having all its rows of links properly placed with reference to each other, the sheet thereby being of any desired width, and likewise to provide a machine that operates not only automatically, but is susceptible of manipulation by hand in order to make repairs or fill in spaces if there should be any omissions or defects due to a failure or inaccuracy in the operation, or defects in the material of which the fabric is composed; and the invention also may be said to consist essentially in the construction, arrangement and combination of the various parts, substantially as will be hereinafter described and then more fully pointed out in the claims.

In the accompanying drawings illustrating my invention:

Figure 1 is a top plan view of my improved link-mesh machine.

Figure 2 is an enlarged cross-sectional elevation of the same on the line 2, 2, of Figure 1.

Figure 3 is a cross-section on the line 3, 3, of Figure 1, certain parts being in elevation.

Figure 4 is a cross section on the line 4, 4, of Figure 1.

Figure 5 is a vertical sectional view taken on the line 5, 5, of Figure 1, the same being at right angles to the sections shown in Figures 2, 3, and 4.

Figure 6 is a rear elevation of the machine.

Figure 7 is a vertical sectional view on the line 7, 7, of Figure 1.

Figure 8 is an enlarged detail plan view of the link-forming mechanism.

Figure 9 is a detail front elevation of a portion of the pin roll or mesh-carrying cylinder and the means for imparting intermittent rotary impulses thereto.

Figure 10 is a sectional side-view of the same on the line 10, 10, of Figure 9.

Figure 11 is a sectional detail of the special device shown in Figures 9 and 10 for controlling the position of the end links, the same being in section on the line 11, 11, of Figure 9.

Figure 12 is a sectional detail of a clutch device employed in connection with the shaft on which the mesh support is intermittently reciprocated.

Figure 13 is a sectional side view of the same on the line 13, 13, of Figure 12.

Figure 14 is a sectional side view of the same on the line 14, 14, of Figure 12.

Figures 15, 16, 17, 18, and 19 represent more or less conventionally and in outline the means for carrying a piece of wire through the various stages of the method which converts it from a straight section into a U shape and then into a circular link, and then engages the same with other links of the fabric.

Figure 20 is a vertical section of the horizontally-reciprocating front slide and the U-wire holder and other parts carried thereby, taken on the line 20, 20, of Figure 21.

Figure 21 is a horizontal plan of the same, in partial section, with the U-wire holder omitted, and showing the pusher tongue in position.

Figure 22 is an enlarged horizontal sectional detail of certain of the link-forming devices, when the parts are in the position shown in Figure 19, or in Figure 25, and a link is being closed into its circular form and caused to engage two other completed links on the next row.

Figure 23 is a perspective detail view of the U-wire holder and former.

Figure 24 represents a piece of finished mesh, and shows a newly-formed link at the time it is being interengaged with two completed links thereof, certain parts being sectioned on line 24, 24, of Figure 22.

Figure 25 is a vertical section on the line 25, 25, of Figure 22, with the forming mandrel in side view.

Figure 26 is an edge view of a link.

Figure 27 is an end view of the parts shown in Figure 20.

Figure 28 is a vertical section on line 28, 28, of Figure 20.

Figure 29 is a side view of a modified form of the mesh support.

Figure 30 is a plan view of the same.

Figure 31 is a cross-section on the line 31, 31, of Figure 30.

Figure 32 is a plan view of a comb device for carrying the mesh.

Figure 33 is a side view, and

Figure 34 an end view of an alternate construction of the pin roll.

Figure 35 is a detail plan view, and

Figure 36 is a detail section of the modified comb device for holding the interengaging links.

Similar characters of reference designate corresponding parts throughout all the different figures of the drawing.

The machine has a horizontal table 1 constituting a portion of its main frame, in connection with which the various mechanical elements are suitably arranged, said table or main bed 1 being mounted on a number of proper legs or supports 1ª. At the rear of the table 1 are suitable journal bearings 3, 3, in which is mounted a main horizontal drive shaft 2, having thereon, preferably at one end, a fast and loose pulley 4, and at the other end a cam wheel 15 in the side of which is a cam groove 52ª that is engaged loosely by a horizontal pin 52 projecting from a rocker arm 14 whose opposite end is rigidly attached to a horizontal rock shaft 13, mounted preferably upon the main table or bed 1 and carried in proper bearings 13ª secured to said table. Said rock shaft 13 is provided with a longitudinal groove 69 to allow a pair of angular trippers 31, 31, to be adjustably fixed therein at a suitable distance apart, so that they may act in connection with latches on the transversely-movable mesh or fabric support 24 that travels horizontally back and forth across the table 1, and carries the mesh while it is being fashioned by the link-forming device, and also supports the finished mass of the fabric, as will be presently more fully explained. It will be understood that the revolution of the main shaft 2 will vibrate the rock lever 14 and in turn rock the shaft 13 back and forth so as to correspondingly move the trippers 31, and cause them to function at the proper instant. While the mesh fabric is being made it must be supported on some suitable device, as a pin roll 96 covered with small pins that engage individual links or rings. 97 denotes the fabric, a finished rolled up mass of which is shown at 98, see Figure 2, while the working edge of the fabric hangs vertically over the front cross rail 107, see Figures 2 and 10. The details of the devices at the ends of the pin roll 96 which is carried by shaft 28 at the front of the carriage 24, for giving to the roll an intermittent partial rotation at the end of each transverse movement of the carriage 24, are shown fully in Figures 1, 9 and 10. On the left-hand end, for example, of the pin roll 96 is a ratchet wheel 30, which is engaged by the escapement 33 on a shaft 27 having arms 99 and 32 which are acted upon by one of the trippers 31 at the end of each transverse movement of the carriage 24 to impart a movement to the pin roll equal to one tooth of the ratchet wheel 30. A movement is given to the pin roll at the ends of the travel of the carriage 24 by the tripper 31 which acts against the arms 99 and 32 fast on rock shaft 27 mounted in frame 24, there being between arms 99 and the frame 24 springs 29 to return the shaft to position after each oscillation thereof, and thus after each partial rotation of the pin roll.

At the left hand side of the table 1, or at some other suitable point, is a wire holder or bobbin consisting of a spool 7 on which the wire 8, of any suitable metal, as gold or silver, is wound and from which it is drawn off, as in the section 80, into suitable cutting and forming devices arranged above the table 1 in a manner to be presently explained, said spool 7 being carried by a screw shaft 10 that is mounted in a holder 9 fixedly carried by an arm 12 secured to the table 1. The screw shaft 10 is preferably provided with a nut or milled head 11 together with a clamping screw for keeping it in proper position in holder 9 and permitting it to be removed therefrom whenever desired. Any suitable means, however, may be substituted as desired for carrying the wire or other material which is to the operated upon in the formation of the mesh. The wire 80 is fed forward by a feed mechanism to the cutter which cuts a portion for each link, after which certain devices bend each cut off part into a U shape and then into a ring and engage it with other rings to form the mesh.

Arranged above the table 1 and parallel to the main drive shaft 2 is another shaft 5, supported in journal bearings 70, 71, and 72 and having throughout its length different diameters and different constructions at different points, the main portion thereof being the screw-threaded section 5ª on which travels the nut 54 that is affixed to the traveling mesh support 24 which moves transversely back and forth over the flat bearings 71 and 72 (see Figure 7), through the revolution of the section 5ª of the shaft 5 when a proper agency operates to move said shaft. Further the shaft 5 will be seen to be provided at one end with a hand wheel 6 for the purpose of rotating it, thus enabling the mesh fabric to be manipulated by hand when required, for repairing the fabric, etc. Shaft 5 is driven, moreover, by means of the pinions 18 and 20 that are respectively in mesh with the gear segments 19 and 21. Segment 19 is carried by an arm 55 whose inner end is a sleeve 55ª mounted upon a horizontal pin 53 that is supported in hangers 73 secured below the main table 1, while the segment 21 is formed integral with the arm 74 the inner end of which is provided with a sleeve 74ª which is loosely mounted on the pin 53, all as clearly indicated in Figure 7. Referring to Figure 1, it will be seen that on the main drive shaft 2 are two cam wheels 22 and 23 which are enclosed loosely by rings 16 and 17 having arms that are pivotally attached to the aforesaid segment gears 19 and 21. The said ring 16 is shown in Figure 3, as having an arm 16ª which is pivoted to the inner portion 55 of segment 19 by means of a pin 16ᵇ, and the other ring 17 is similarly related to the segment gear 21. In this way the revolution of the shaft 2 vibrates the segments 19 and 21, so that the pinions 18 and 20 when laterally engaged with the clutch sections 62 and 63 that are securely fastened to the shaft 5 as shown in Figure 1, intermittently rotate shaft 5 and thus move the mesh support 24 step by step in one direction or the other, back and forth over the table 1. The pinions 18 and 20 are mounted loosely upon a sleeve 75 which is loosely carried on the shaft 5, and the vibration of the two arms 55 and 74, by means of the cams 22 and 23 simultaneously in opposite directions will cause the pinion 18 or 20 which is in clutch to impart an intermittent rotation to the screw 5ª, such rotation being a single thread or so, and either the whole or part of a revolution, so that the mesh carried may be fed to the right or to the left. For at the end of each such transverse travel the pinion 18 or 20 which is in clutch will be thrown out of clutch and the other pinion be thrown into clutch, and thus the revolution of the shaft 5ª will be reversed for the purpose of enabling the mesh carriage to be intermittently moved across the table 1 in the opposite direction, it being seen that when one pinion is being rotated effectively, the other will be rotated idly. The details of one form of clutch mechanism are shown in Figures 12, 13, and 14. The clutch section 63, which is fast on shaft 5 carries a pin 101 acted on by a spring 102, the end of which pin rides on a cam ring 103 on the adjoining face of pinion 20, so that the intermittent rotary action of the pinion 20 will be imparted to clutch member 63 and shaft 5 when the pinion 20 is shifted so as to lie close to clutch member 63. A similar arrangement exists with clutch member 62 and pinion 18. The shifting of the pinions 18 and 20 at the end of each horizontal travel of the carriage 24 so as to throw the one out of engagement and the other into engagement and produce a reverse rotation of the shaft 5, is accomplished by means of devices (see Figures 1 and 6) consisting of a longitudinal slide 64 carried in a horizontal guide groove in the rear of the main frame, said slide 64 having at the end a right-angled projecting finger 68 that loosely engages a circular groove 95 in the pinion-supporting sleeve 75. At the end of each transverse movement of the carriage 24 the bar 64 is moved endwise relatively to said carriage, so that its finger 68 may push the sleeve 75 in one direction or the other and thus disengage one of the pinions and engage the other pinion with clutch members 62 or 63 as the case may be, which will produce a reversal of the direction of revolution of the shaft 5. This endwise movement of the member 64 is accomplished by the contact of the projection 89 on the rear of the traveling carriage 24 with a projection 88 on one or the other of the pivoted vertical levers 87, hanging preferably behind a right-angled frame or bar 86 which is secured to the stationary frame members 71 and 72, the only purpose of said frames 86 being to keep the swinging arms 87 in proper position. Thus the horizontally-reciprocating slide 64 is at the end of each transverse movement of the carriage shifted endwise by means of the projection 89. The lower free ends of the swinging levers 87 are connected loosely by means of links 94 with plates 91 which are adjustably applied by bolts 93 to the bar 64, the latter being provided with a series of perforations 92, by means of which the connection of the plates 91 with the bar 64 may be changed and varied and thus the swinging of the levers 87 changed and thus the adjustment of the pinions varied as to time. When the bar 64 shifts at the end of its stroke, it is held temporarily in its shifted position by means of the stationary spring 65, see Figure 1, secured to the main frame and having a V shaped catch 67 which engages a correspondingly V shaped catch 66 on the bar 64, that is to say the endwise movement of the bar 64 at the end of each transverse movement of the carriage 24 causes the V projection 66 to ride underneath and lift the spring V projection 67 so that the latter will be on one side or the other of the V shaped projection 66 as indicated in Figure 1, and will therefore hold the bar 64 in this position until the projection 89 acts again against one of the levers 87 at the end of the next reciprocation of carriage 24.

The transversely movable carriage 24 which carries the mesh consisting of the finished work 98 as well as the mesh 97 while it is being made, is of a rectangular form with side sections 25 connected by a rear rod 26, intermediate rods or bars 26ª and 27, and a front rod 28, which supports the pin roll or equivalent device. Rod 27 is mounted to rotate as explained. Of course there may be less or more of these cross connections, and the frame may vary a great deal in its construction. In the front portion of the frame on or at rod 28, as indicated in Figure 2, is the pin roll 96, consisting of a roller whose surface is covered with projecting pins, adapted to be engaged by the links of the fabric, which latter is shown at 97 as hanging downwardly over the pin roll in close proximity to the vertically movable forming pin I³, while the mesh fabric is carried back over the movable frame 24, which will be properly shaped and provided with suitable boxes or other means to enable the finished product to be rolled up into a mass, as indicated at 98, or otherwise taken care of and kept taut during the operation of the machine. The movement of the frame 24 under the action of the devices already described is properly timed and regulated to give to the pin roll a step by step motion in one direction or the other, in order that the mesh may be presented to the forming devices in such a way that the new links will be successively interengaged with the links of the finished mesh in a regular series along the edge of the latter as said edge depends, as shown in Figure 2, alongside of the forming pin I³ and the other appliances which will be hereinafter more fully set forth. For it will be necessary, therefore, not only to carry the finished fabric back and forth across the face of the machine, but also to lift it up as soon as each row is finished, move it backward over the frame 24 to give opportunity for the making of another row of links, and therefore an intermittent partial rotation must be given to the pin roll 96 and this is done by the devices already described, consisting of rock-shaft 13 having thereon the trippers 31, which are arranged to rock back and forth with the shaft 13.

Referring now to Figures 1 and 6 it will be seen that on the main shaft 2, near the middle portion thereof, is a series of nine cams A, B, C, D, E, F, G, H, and I, of greater or less size and of variable eccentricity, arranged to perform different functions with certain reciprocating rods and rock levers in order to effectuate certain results, all the movements being properly timed with relation to each other. I will explain these cams and the results of their action.

Cam I acts upon a rock lever $i$ pivoted to the main frame at $i^1$ (see Figure 2), the opposite end of which lever $i$ acts beneath the lever $I^1$ (see Figure 5) pivoted beneath the main table 1 and having its end arranged in connection with the lower end of a vertical sliding bar $I^2$, which carries at its upper end the final shaping pin or mandrel $I^3$ (see Figure 2) which acts in conjunction with the work in holding the links in position while each is being finally closed, as will be explained. Said vertically-movable pin-carrying bar $I^2$ has thereon a stop 34 which strikes the table 1 in the descent of the bar so as to limit its downward movement, and underneath the table 1 the bar $I^2$ is surrounded by a spring $I^4$ tensioned beneath the table and a fixed collar 35 on said bar, which spring has the function of returning the bar $I^2$ and consequently the pin $I^3$ downwardly each time after it has been lifted and then released by the lever $i$, all as clearly shown in Figures 2, 4, and 5. The cam I may have one or more salients or risers, related to each other as desired and of any shape and form, so as to impart to the pin $I^3$ either one or several movements during each revolution of the shaft 2, but usually I find it convenient to have the cam built as a double cam so that the pin $I^3$ may have two lifts during each revolution of shaft 2.

Cam H is arranged in line with a horizontal rod $h$ (see Figure 2) and operates to reciprocate the same, the effect of which is to vibrate the upright lever 56, which is pivoted at 57 on the main frame, the extent of the vibration of lever 57 being regulated by an adjusting screw 58 in the lower end of the lever which bears against the end of the rod $h$. The upper freely-movable end of the lever 56 acts against a front horizontal slide 59 which carries at its opposite end a certain part of the link-forming devices, as I shall specify. This slide 59 not only reciprocates in a horizontal plane, but is vertically-reciprocable also by carrying means driven also from the main shaft, as will be pointed out.

Cam G is in line with and operates to reciprocate the horizontal rod $g$ whose opposite end acts against and vibrates a vertical lever $G^1$ pivoted at its lower end at $g^1$ to the main frame (see Figure 5); the upper end of which rod $G^1$ loosely engages and actuates a slide $G^2$ supported in one side of a block member 77 of the main frame bolted or mounted on the table 1. This slide C² carries at the end thereof a vertical pin G³ which constitutes the initial forming pin to make the first U shaped bend in each straight piece of link wire, and which pin is, in the manner explained, moved back and forth as the result of the revolution of the cam G, its movement being in close proximity to a knife D⁵ which cuts off the proper length of wire for the link.

Cam F is underneath and acts upon one end of a lever $f$, see Figure 2, said lever having a bell-crank or right-angled form, and pivoted at its angle by means of the pivot $f^1$ in the main frame, the vertical arm F¹ of said lever engaging and reciprocating a rear sliding block F² which carries the means for tightly closing the link or links after they are delivered to the forming pin I³ by the devices on slide 59.

Cam E is in line with and operates against one end of a long horizontal lever $e$, pivoted near its middle point at $e^1$ to the main frame and having its opposite end loosely connected with a vertically movable slide 61 working in a guide passage in frame member 77, table 1 and other parts, see Figure 2, on the upper end of which slide 61 is formed an integral horizontal plate 60 having therein a guide groove in which the above mentioned slide 59 reciprocates under the action of lever 56. The cam E therefore operates to intermittently lift a certain portion of the link-forming devices into a position where they are thrust forward by the action of the cam H into active relation to other of the link-forming devices.

Cam D is in line with and is arranged to reciprocate a horizontal rod $d$, the opposite end of which bears against and vibrates a vertical lever D¹ pivoted at its lower end at D² to the hanger D³ underneath the main table 1, which hanger is similar to the hanger to which the lever G¹ is pivoted, and the upper end of said lever D¹ engages a slide D⁴ arranged in the side of the frame member 77 opposite to that point where the slide G² is located, said slide D⁴ moving back and forth in consequence of the mechanism described and carrying a knife D⁵, as shown in Figures 1, 2, and 5, which is in close proximity to the initial forming pin G³ and is adapted to cut off the wire after the proper length thereof to form a link has been introduced to the link-forming devices and is in contact with the initial forming pin G³ to be bent into its preliminary U shape, as shown in Figure 16. As soon as the wire is cut, it is caught by said forming pin G³ and placed in a holder 43 which lifts it and carries it forward to the means for closing the link in circular form.

Cams A, B, and C perform functions in relation to horizontal rods which feed the wire 80 from wire roll 8, and deliver it in the proper manner to the link-forming devices. Thus cam A reciprocates a horizontal rod $a$, whose opposite end vibrates the lever A¹, the upper end of which carries the clamp A² which clamps the wire 8 at a certain time; cam B actuates a horizontal rod $b$ and causes it to vibrate a horizontal arm 100 attached to the lower end of a vertical rod B¹, whose upper end carries a horizontal arm B² that engages and slides a clamping device B³, acting as a holder for the wire and being returnable after each forward movement by the action of a spring 79 attached to a stationary part of the frame and to the forward end of this slide B³; while cam C operates to reciprocate a horizontal rod $c$, the opposite end of which vibrates a clamping member C¹ and causes the wire to be firmly held in the holder B³ while it is being carried forward. While the various details of the wire-feeding mechanism are not shown, and I do not wish to be confined thereto, since many other kinds of wire feeds may be substituted in lieu thereof, yet I have shown this one form as a practical example of a device that can be successfully employed for the purpose, and may say in general that the operation consists in causing clamp C¹ to hold the wire 80 firmly in the slide B³, after which the slide B³ is moved forward by the lever B², so that the end portion of the wire is brought directly opposite to the forming pin G³, in order that thereafter said end portion thereof may be bent into a U shape and the knife D⁵ may have an opportunity of cutting it off; but just before the knife D⁵ acts, the clamp C¹ releases and the clamp A² grips the wire and holds it in position while the knife is cutting. As soon as the cut is made the clamp A² releases and the clamp C¹ acts again, so that the wire may be fed forward for the making of the next link.

It is to be observed moreover that the various horizontal reciprocating rods are suitably supported in bearings beneath the table 1, of which bearings I have given 76 and 76ᵃ as examples, and it will also be seen that it will be convenient and desirable to provide the ends of the reciprocating rods and also of the levers against which the various cams act, with suitable anti-friction rollers, so that the movement may be easier. In fact anti-friction rollers may be located between the ends of many contacting parts which it is unnecessary to mention throughout this description.

I have described a vertically-movable bar 61 having thereon a flat support 60 grooved or otherwise shaped to provide a guide wherein the slide 59 can reciprocate under the action of the lever 56. As the bar 61 lifts the slide 59 into proper position, opposite to certain of the link forming tools, the lever 56 shoots the said slide through the guide towards the tools and the hanging fabric 97 which is directly in front of and supported on the pin roll 96, as indicated in Figure 2. A cross head 36 is fastened to the slide 59 near the front end thereof, and a pair of springs 37, 37, are attached to said cross head and also to the main body 60 for the purpose of returning the slide 59 after each forward thrust of the same. The said cross head on its return strikes against the head of the screw stop 40, which is supported adjustably in an arm 39 projecting on the sliding member 60.

Referring now to Figures 20 and 21, the slide 59 has a slotted forward projection 50 and carries in the slot thereof a tongue 49, which projects beyond the end of the slot. 43 designates a wire holder composed of a plate having a right-angled flange 48 with lateral recesses 85 cut therein and perforated centrally, so that when this holder is in position with the member 48 upright, as indicated in Figure 20, a screw 45 may pass through the perforated member 48, said screw being fixed permanently and rigidly in the body of the slide 59 and having a head 47 on the outside of the flange 48 and a spring 46 tensioned between the body of slide 59 and the flange 48, the purpose of which spring 46 is to thrust the holder 43 forward after certain detentions which occur to it in the operation of the machine. Holder 43 is in detail in Figure 23. Further the holder 43 is provided on its under side with a number of parallel ribs 44, enlarged at their outer ends and having interior oppositely-located grooves adapted to receive the U-shaped partially formed wire link as the same is bent and introduced thereinto by the initial forming pin $G^3$. When the slide 59 moves forward toward the final shaping pin $I^3$ the abutment 48 on the holder 43 will, at a certain point, strike against the rigid arm 41 which is projecting into the path of such movement, which will arrest the further movement of the holder 43, and cause spring 46 to be compressed, but will not impede the further movement for a short distance of the slide 59, and as said slide carries the rigid projecting tongue 49 which when the parts are in position lies between the parallel ribs 44 on the holder 43, the effect of this further movement of the tongue 49 beyond holder 43 will be to push the bent U-shaped wire out of said holder and away from the interiorly-grooved sides of the ribs 44 and enable it to be taken by the forming pin $I^3$ and the other co-acting shaping devices for the purpose of being further operated upon in the making of the complete link. The stages of this progress of the wire section are shown in Figures 15 to 19. The upper end of shaping pin $I^3$ is inclined, so that the link may easily ride upon it. Opposite to the holder 43 and tongue 49 which I have just been describing is the slide $F^2$, whose actuation has already been explained, and this carries a rear former whose function it is to close the ends of the U-shaped wire together into a complete round link, said former consisting of a small plate 42 having a semi-circular opening in the outer end thereof, the edge of which opening is interiorly grooved to receive the wire, as seen in Figures 15, 16, and 17.

At the proper time in the movement of the various parts the front initial forming pin $G^3$, which is carried by the slide $G^2$ that reciprocates in ways in frame 77, will be contiguous to the wire 80, as shown in Figure 15, when a section of said wire is immediately opposite to the slot 83 between the two abutments 82 of the main frame, and said pin $G^3$ will be caused to travel horizontally toward the wire and to bend the same into a U shape, as shown in Figure 16, and to continue such bending by pressing it between the jaws 82. At the moment when the bending begins to be performed the knife $D^5$ horizontally approaches the wire 80 and cuts off a piece long enough to form a single link. This link is pushed between the jaws 82 by the advance of the pin $G^3$, and is then introduced between the interiorly-grooved ribs 44 of the U-wire holder 43 and thus delivered to said holder. The latter is then immediately lifted vertically by the action of the vertical bar 61 into the position shown in Figure 2 where it is above pin $G^3$ and knife $D^5$, and immediately thereafter is carried forward by the horizontal movement of the slide 59 until it approaches the reciprocating rear carrier $F^2$ having thereon the former 42 which advances to meet the holder 43, there being between the carriers the vertically-movable link shaping pin or former $I^3$. To this pin the U-shaped piece of wire in holder 43 is delivered at the instant when the pin is between the pendent links $m$, see Figure 24, so that the ends or legs of the U-shaped wire may enter the two links. The holder 43 advances until its abutment 48 strikes against the stationary bar 41, when it is detained, but the slide 59 continues to advance further and carry with it the tongue 49 which takes the U-wire in its grooved end and pushes it out of the grooved pieces 44 of holder 43. The advance movement of the tongue 49 as soon as the holder 43 has been thus stayed in its movement by contact with the fixed bar 41, as indicated in Figure 25, so places the U-shaped wire that it will surround the shaping pin $I^3$, and the latter will engage and hold it, and at the same moment, inasmuch as the section M of the mesh fabric is depending alongside of the shaping pin $I^3$, the said partially formed link in its U shape will be caused to engage two adjoining links *m* of the fabric, all as clearly seen in Figures 18, 19, and 24. When this juxtaposition of the various parts occurs the rear forming member 42 on the slide F² will move forward under the action of the lever F¹ toward the pin I³, and the semicircular groove in the member 42 will now receive the partially formed link and will shape it and close it in complete circular form upon the round body of the pin I³, as indicated in Figure 25, and the link, which is now designated as O will be completely shaped in circular form and interengaged with two adjoining complete links of the finished mesh, said links *m* at this time hanging down vertically, while the newly formed link O is in a horizontal position until released from the shaping and bending action of the co-acting mechanical members. All this will be clearly seen by reference to the sectional view of Figure 24, where the various parts are clearly indicated in relation to the former I³, and in Figure 22 where the link O is seen as receiving its final circular form, and as being closed with the ends of its wire ready to bite tightly against each other while this horizontal link O is passed through the interior spaces of the contiguous finished links *m* of the fabric M. After the slide F² finishes its action and the shaping member 42 is through with the forming of the link, the springs 38 which are fastened to the slide F² and are also attached to stationary portions of the frame have the effect of returning slide F² to its normal position, where it will be ready to go through the same series of actions with the next link. Also springs 37 return slide 59 and holder 43 to their normal positions; spring 78 returns the knife D⁵ and spring 81 returns pin G³ to positions for their operations in making the next link.

The mesh 97 already made hangs from the pin roll 96, down alongside the horizontal transverse bar 107, see Figures 2 and 9. The carriage 24 which supports it reciprocates transversely, as I have shown, and carries the lower row of links in close proximity to the link forming devices so that a new row of links may be added at each transverse movement. It is necessary therefore that the mechanism should operate accurately to reverse the movement, and also that the movement horizontally should always be step by step, just the proper distance for the addition of each new link, and this intermittent movement is accomplished through the partial rotations of the screw shaft as explained; also that the pin roll should be partially rotated at the end of each movement of the carrier so as to advance the finished fabric and position it in readiness for the new row of links. At one or both ends of the frame 24 is a spring finger 104 carried in the projection 106 secured to the frame, on which finger bears a spring 105 to hold finger 104 against the pin roll 96. Said spring 104 passes through the end row of links and serves to hold the same as they are formed and to keep them in position for the next interlocking links, the end links being formed around said finger at the same time they are formed over mandrel I³. Behind the lower edge of the mesh reciprocates vertically the link-shaping mandrel I³, dropping regularly after each link is formed thereon to release the same, and rising as regularly after the readjustment of the position of the fabric so as to occupy a position behind the next two links, as indicated in Figure 24 and as already explained.

In certain figures I have indicated certain devices which I find it convenient to employ as supplementary to the action of the final shaping mandrel I³, consisting of a couple of pins 130 and 131 attached to the side or top of the mandrel alongside the central shaping member of the same. These pins are so set that one will be in front of the ring fabric 97 and one behind the same, and they serve to align the edge of the fabric and to cause the links of the lower finished row to properly depend in position to be engaged by the legs of the U-shaped wires, thus preventing them from kinking up or hanging in a wrong position such as would prevent the proper interengagement of the new links. These pins 130 and 131 may have right-angled heads or other shapes that will best fit them to do their work effectually, and their position relatively to the central member I³ may vary within wide limits.

In lieu of a pin roll, as 96, I may use a pair of combs 111 and 112, as shown in Figures 31, 32, 35 and 36. These combs are carried by being pivoted in the crank arms 135 and 134 carried by shafts 132 and 133, said comb 111 having its members 114 formed on a frame 110, provided with a counterbalance 137, and said comb 112 having its members 113 provided with a counterbalance 136. These combs interlock and rise and fall so as to transfer the finished mesh back on the mesh support at the end of the link-making operation on each row. Also in Figures 33 and 34 I show a modified construction of pin roll, where instead of a single roller with its whole surface studded with pins, I use sections 108 between which are pin provided discs 109, all arranged on a shaft 140. In Figures 29 and 30 I use threads 138 and 139 at the ends of the mesh support in lieu of the finger 104, said threads being passed through the end links of the mesh to keep said links in proper position. These threads are held by needles 115 and 116, and spools are provided for the winding of the threads. Other modifications and alternate forms may be devised and substituted in securing the best results.

While I have described and shown complete means for making mesh of any shape, size and form, either flat or tubular, or of any other design, it will be understood that I am at liberty to modify and change the details of structure and combination within wide limits within the scope of the appended claims.

Having thus described my invention, what I claim as new and desire to secure by Letters Patent is:

1. In a link-mesh machine, the combination of a mesh-fabric support, a wire feed, a cutter for the wire, means for forming links of the cut portions and connecting them to the fabric, consisting essentially of an initial bending pin, a holder for the U-shaped wire, said holder having a vertical and a longitudinal movement, a shaping mandrel on which the link is completed, and a rear forming device that cooperates with the holder.

2. In a link-mesh machine, the combination of a mesh fabric support, means for feeding and cutting the wire, means for forming links of the cut portions and connecting them to the fabric, consisting essentially of a bending pin, a holder for the bent wire said holder having a vertical and a longitudinal movement, a slide carrying said holder and having an ejecting forming tongue, means for staying the movement of the holder while the forming tongue advances further to eject the wire from the holder, a shaping mandrel, and a rear forming device that cooperates with the said tongue to close the wire into circular form upon the mandrel.

3. In a link-mesh machine, the combination of a mesh fabric support, means for feeding and cutting the wire, means for forming links of the cut portions and connecting them to the fabric, consisting essentially of a bending pin, a holder for receiving the U-shaped wire said holder having a vertical and a longitudinal movement, a pusher tongue for ejecting the wire from said holder, a shaping mandrel, and a rear forming device that cooperates with the ejector tongue to close the wire into circular form around the mandrel.

4. In a link-mesh machine, the combination of a mesh fabric support, means for feeding and cutting the wire, means for forming links of the cut portions and connecting them to the fabric, consisting essentially of a horizontally movable bending pin, a holder for the wire after it is bent, a vertically and horizontally movable slide carrying said holder and having an ejecting forming tongue, said tongue moving further than the holder itself, so as to eject the wire from the holder, a mandrel on which the U-shaped wire has its legs closed together to form a circular link, and a rear forming device that cooperates with the said tongue in the said closing movement.

5. In a link-mesh machine, the combination of a mesh fabric support, means for feeding and cutting the wire, means for forming links of the cut portions and connecting them to the fabric, consisting of a bending pin, a vertically and horizontally movable front former and a horizontally movable rear former, together with a vertically movable mandrel which passes through the inside of the link when the formers cooperate to close the link in circular form upon said mandrel.

6. In a link-mesh machine, a bending pin, front and rear cooperating forming devices, the front device having a vertical and also a horizontal movement, said horizontal movement having two forward impulses in order that the wire may be held while being lifted and may then be ejected, a shaping mandrel for supporting the wire while it is having its ends closed together to form a circular link, said mandrel being vertically movable.

7. In a link-mesh machine, the combination of a mesh fabric support, a pin roll rotatably mounted to engage the links of the fabric, means for feeding said pin roll step by step transversely across the machine and means for intermittently imparting impulses of rotation thereto, means for feeding and cutting off sections of wire to form the links, tools for shaping said links and applying them to the free edge of the fabric, said tools consisting essentially of a vertically movable shaping mandrel, a bending pin which is horizontally movable, a holder for receiving the wire after it is bent, means for lifting said holder and then moving it horizontally and detaining it in the latter position, means for removing the wire from the holder when so detained, and rear forming means cooperating with the aforesaid means for closing the wire into circular form upon a mandrel.

8. In a link-mesh machine, the combination of a mesh fabric support, means for feeding and cutting the wire, a laterally movable bending pin, a grooved holder for receiving the U-shaped wire, a vertically movable slide carrying the holder and having a horizontal movement when lifted, a pusher tongue on the slide which removes the wire from the holder, a shaping mandrel, and a rear slide having a grooved former for cooperating with the aforesaid pusher tongue when the parts are brought together to complete the shaping of the link.

9. In a link mesh machine, the combination of a mesh fabric support, a feed device, a cutter, a bending pin, a holder receiving the U-shaped wire from the bending pin means for lifting said holder vertically and then horizontally, said means including a device for ejecting the wire from the holder when the holder ceases its horizontal movement, a mandrel on which the link is finally made, and a movable rear former which co-operates with the front devices in completing the shaping of the link.

10. In a link-mesh machine, the combination of a mesh-fabric support, a wire feed, a cutter for the wire, means for automatically reversing the direction of the progress of the work, and means for forming links of the cut portions of the wire and connecting them to the fabric, consisting essentially of an initial bending pin, a holder for the U-shaped wire, said holder having a vertical and a longitudinal movement, a shaping mandril on which the link is completed, and a rear forming device that co-operates with the holder.

11. In a link-mesh machine, the combination of a mesh-fabric support, a wire feed, a cutter for the wire, means for forming links of the cut portions and connecting them to the fabric, consisting essentially of an initial bending pin, a holder for the U-shaped wire, said holder having a vertical and a longitudinal movement, and means for co-operating with the holder to complete the formation of the circular links.

12. In a link-mesh machine, the combination of a mesh-fabric support, a wire feed, a cutter for the wire, means for forming links of the cut portions and connecting them to the fabric, consisting essentially of an initial bending pin, a holder for the U-shaped wire, a vertically-movable shaping mandril on which the link is completed, and rear forming means co-operating with the holder to complete the making of the circular links.

13. In a link-mesh machine, the combination of a mesh-fabric support, means for feeding and cutting the wire, means for forming links of the cut portions and connecting them to the fabric, consisting essentially of a bending pin, a holder for the bent wire having a vertical and longitudinal movement, a slide carrying said holder and having an ejecting forming tongue, means for staying the movement of the holder while the forming tongue advances further to eject the wire from the holder, means for automatically reversing the direction of the progress of the work, and rear forming means co-operating with the holder to complete the formation of the circular links.

14. In a link-mesh machine, the combination of a mesh-fabric support, means for feeding and cutting the wire, means for forming links of the cut portions and connecting them to the fabric, consisting essentially of a bending pin, a holder for receiving the U-shaped wire and having a vertical and longitudinal movement, a pusher tongue for ejecting the wire from said holder, a shaping mandril, a rear forming device co-operating with the ejector tongue to complete the formation of the circular links, means for automatically reversing the direction of the progress of the work, and means for controlling the movement of the fabric by hand so as to adjust its position to provide for repairs and the like to the fabric.

15. In a link-mesh machine, the combination of a mesh-fabric support, means for feeding and cutting the wire, means for forming links of the cut portions and connecting them to the fabric, consisting of a laterally-movable bending pin, a front former, a horizontally-movable rear former, a mandril which passes through the inside of the link when the formers operate to close the link in circular form upon said mandril, means for automatically reversing the direction of the progress of the work, and means for manipulating the position of the fabric so as to provide for stopping and starting the mechanism when repairs are required.

16. In a link-mesh machine, a bending pin, front and rear co-operating forming devices, the front device having a vertical and also a horizontal movement, said horizontal movement having two forward impulses in order that the wire may be held while being lifted and may then be ejected, a vertically-movable shaping mandril for supporting the wire, and means for automatically reversing the progress of the work.

17. In a link-mesh machine, the combination of a mesh-fabric support, wire cutting and feeding means, a bending pin, a holder for the bent wire having a vertical and a longitudinal movement, a slide carrying said holder and having an ejecting forming tongue, means for staying the movement of the holder while the forming tongue advances further to eject the wire from the holder, means for shaping the link, and means co-operating with the aforesaid means to close the wire into final circular form.

18. In a link-mesh machine, a bending pin, front and rear co-operating forming devices, the front device having a horizontal movement, which movement has two forward impulses in order that the wire may be held and then ejected, and a vertically-movable shaping mandril for supporting the wire while it is having its ends closed together to form a circular link, together with means for controlling the progress of the work automatically.

19. In a link-mesh machine, the combination of a mesh-fabric support, means for feeding and cutting the wire, a horizontally-movable bending pin, a holder for the wire after it is bent, a vertically and horizontally-movable slide carrying said holder and having an ejecting forming tongue, said tongue moving further than the holder does, so as to eject the wire from the holder, a mandril on which the U-shaped wire is closed to form a circular link, rear forming means co-operating in the said closing movement, a main shaft, and a series of actuating cams arranged alongside of each other on said shaft, together with intermediate mechanism between said cams and the aforesaid link-forming devices so that the cams may individually actuate said link-forming devices and cause the links to be completed and connected individually to the fabric.

20. In a link-mesh machine, the combination of a mesh-fabric support, having a cutting means for the wire, means for forming links of the cut portions and connecting them to the fabric, consisting essentially of a bending pin, front and rear co-operating forming devices, a shaping mandril for supporting the wire while its ends are closed together to form circular links, a main driving shaft, a series of cams on said shaft, leverage devices between said cams and the aforeaid link-making devices where the operation of the cams individually actuates the different link-making devices and completes the formation of the links and connects them to the fabric.

21. In a link-mesh machine, the combination of a mesh-fabric support, a pin roll rotatably mounted to engage the links of the fabric, means for feeding said pin roll step by step transversely across the machine, mean for intermittently imparting impulses of rotation thereto, means for automatically reversing the direction of the progress of the work, means for feeding and cutting off sections of wire to form the links, tools for shaping said links and applying them to the free edge of the fabric, said tools consisting essentially of a shaping mandril, a bending pin, a holder for receiving the wire after it is bent, a main driving shaft, a series of actuating cams located thereon, and leverage devices operated by said cams for the purpose of actuating individually the several link-shaping tools in order that the aforesaid links may be formed and applied to the fabric.

22. In a link-mesh machine, the combination of a mesh-fabric support, a pin roll rotatably mounted to engage the links of the fabric, means for feeding said pin roll step by step transversely across the machine and means for intermittently imparting impulses of rotation thereto, means for feeding and cutting off sections of wire to form the links, tools for shaping said links and applying them to the free edge of the fabric, said tools consisting essentially of a vertically-movable shaping mandril, a bending pin which is horizontally movable, a holder for receiving the wire after it is bent, means for lifting said holder and then moving it horizontally and detaining it in the latter position, means for removing the wire from the holder when so detained, and rear forming means co-operating with the aforesaid means for closing the wire into circular form upon a mandril, and a rear drive shaft, a series of cams thereon, and mechanism intermediate between said cams and the link-forming tools whereby the cams function individually and operate the said tools in the making of the aforesaid links and the applying of them to the free edge of the fabric.

23. In a link-mesh machine, the combination of a mesh-fabric support, means for feeding and cutting the wire, means for forming links of the cut portions and connecting them to the fabric, consisting essentially of a horizontally-movable bending pin, a vertically and longitudinally-movable holder for the bent wire, a slide carrying said holder and having a link-ejecting tongue, means for staying the movement of the holder while the ejecting tongue advances further to eject the wire from the holder, said means consisting essentially of a spring pin carried by the slide and engaging the holder, a vertically-movable shaping mandril, and a rear former co-operating with the tongue.

24. In a link-mesh machine, a bending pin, front and rear co-operating forming devices, the front device having a vertical and also a horizontal movement, a shaping mandrel for supporting the wire while it is having its ends closed together to form a circular link, said mandrel being vertically movable.

25. In a link-mesh machine, a bending pin, front and rear forming devices, the front device having a vertical and also a horizontal movement, said horizontal movement having two forward impulses in order that the wire may be held while being lifted and then be ejected, a shaping mandrel having a vertical movement, means for automatically reversing the progress of the work, and mechanism including a series of cams for individually imparting the proper actuation to the aforesaid various link-forming devices.

In testimony whereof I hereunto affix my signature.

KARL F. A. ROLLE.